(12) United States Patent
Dai et al.

(10) Patent No.: US 12,393,753 B2
(45) Date of Patent: Aug. 19, 2025

(54) METHOD FOR CALCULATING HEAD LOSS COEFFICIENT AND BRANCH PIPE FLOW DISTRIBUTION OF MULTI-POINT WATER INTAKE

(71) Applicants: CHINA THREE GORGES CORPORATION, Beijing (CN); CHINA INSTITUTE OF WATER RESOURCES AND HYDROPOWER RESEARCH, Beijing (CN)

(72) Inventors: Huichao Dai, Beijing (CN); Hao Wang, Beijing (CN); Yafei Duan, Beijing (CN); Ping Ji, Beijing (CN); Yijun Zhao, Beijing (CN); Dingguo Jiang, Beijing (CN); Hanqing Zhao, Beijing (CN)

(73) Assignees: CHINA THREE GORGES CORPORATION (CN); CHINA INSTITUTE OF WATER RESOURCES AND HYDROPOWER RESEARCH (CN)

( * ) Notice: Subject to any disclaimer, the term of this patent is extended or adjusted under 35 U.S.C. 154(b) by 218 days.

(21) Appl. No.: 17/440,668

(22) PCT Filed: Mar. 19, 2021

(86) PCT No.: PCT/CN2021/081858
§ 371 (c)(1),
(2) Date: Sep. 17, 2021

(87) PCT Pub. No.: WO2021/253902
PCT Pub. Date: Dec. 23, 2021

(65) Prior Publication Data
US 2023/0108059 A1    Apr. 6, 2023

(30) Foreign Application Priority Data
Jun. 18, 2020  (CN) .......................... 202010558405.2

(51) Int. Cl.
*G06F 30/28*  (2020.01)
*G06F 30/18*  (2020.01)
(Continued)

(52) U.S. Cl.
CPC .............. *G06F 30/28* (2020.01); *G06F 30/18* (2020.01); *G06F 2113/14* (2020.01); *G06Q 10/0631* (2013.01)

(58) Field of Classification Search
USPC ........................................................... 703/2
See application file for complete search history.

(56) References Cited

U.S. PATENT DOCUMENTS 7,830,273 B2 * 11/2010 Twitchell, Jr. ........ H04L 67/125
                                                        340/870.07
8,175,859 B1 *  5/2012 Wu ........................ G06Q 50/06
                                                             703/9
(Continued)

FOREIGN PATENT DOCUMENTS

CN        106649968      * 10/2016 ............. G06F 30/18
CN        106649968 A      5/2017
(Continued)

OTHER PUBLICATIONS

Ray Hardee (Calculating Head Loss in a Pipeline, 2015, Pumps & Systems, pp. 1-10) (Year: 2015).*
(Continued)

*Primary Examiner* — Iftekhar A Khan (57) ABSTRACT

The present invention relates to a method for calculating a head loss coefficient and branch pipe flow distribution of a multi-point water intake. The method includes the following steps: inputting and determining a structure and size information of the multi-point water intake; determining a head loss coefficient; determining a head loss coefficient form of a confluence port; pre-estimating or adjusting a trial flow;
(Continued)

performing trial calculation on the head loss coefficient of each branch pipe; comparing the head losses calculated by two flow paths; and carrying out overall calculation. According to the present invention, the flow of each branch pipe is adjusted and the head loss coefficient is repeatedly calculated by utilizing iterative calculation of the head loss coefficients of the flows in two directions, so that the head loss and the flow distribution proportion can be finally and accurately calculated.

2 Claims, 4 Drawing Sheets

(51) Int. Cl.
    *G06F 113/14*         (2020.01)
    *G06Q 10/0631*     (2023.01)

(56) References Cited

U.S. PATENT DOCUMENTS

| | | | | |
|---|---|---|---|---|
| 8,479,566 | B2* | 7/2013 | Haseloh | G01M 3/2815 |
| | | | | 73/49.1 |
| 8,635,051 | B1* | 1/2014 | Wu | G06N 3/126 |
| | | | | 703/9 |
| 8,820,143 | B2* | 9/2014 | Sarma | G01M 3/2807 |
| | | | | 73/49.1 |
| 9,366,596 | B2* | 6/2016 | Mekid | G01M 3/2823 |
| 9,558,453 | B1* | 1/2017 | Chaudhary | G06Q 10/04 |
| 10,956,641 | B2* | 3/2021 | Kusumoto | G06F 30/20 |
| 11,204,299 | B2* | 12/2021 | Kanniganti | E03B 7/071 |
| 11,454,354 | B2* | 9/2022 | Kusumoto | E03B 1/00 |
| 11,580,273 | B2* | 2/2023 | West | G06F 30/20 |
| 2003/0033117 | A1* | 2/2003 | Sage | G06F 30/13 |
| | | | | 702/182 |
| 2006/0283251 | A1* | 12/2006 | Hunaidi | G01N 29/222 |
| | | | | 73/597 |
| 2011/0097152 | A1* | 4/2011 | Kim | E03B 3/36 |
| | | | | 405/52 |
| 2013/0042613 | A1* | 2/2013 | Ross | F03G 7/05 |
| | | | | 29/428 |
| 2013/0103370 | A1* | 4/2013 | Barley | G06F 17/10 |
| | | | | 703/2 |
| 2015/0187025 | A1* | 7/2015 | Wasserkrug | G06Q 50/06 |
| | | | | 705/7.12 |
| 2015/0308627 | A1* | 10/2015 | Hoskins | G01F 1/00 |
| | | | | 702/45 |
| 2015/0357064 | A1* | 12/2015 | Legendre | G21D 1/00 |
| | | | | 376/405 |
| 2016/0097566 | A1* | 4/2016 | Suzuki | F24V 50/00 |
| | | | | 165/45 |
| 2016/0252422 | A1* | 9/2016 | Howitt | E03B 7/071 |
| | | | | 73/40.5 A |
| 2016/0267608 | A1 | 9/2016 | Rickets et al. | |
| 2017/0132338 | A1* | 5/2017 | Al Gahtani | G06F 30/20 |
| 2017/0308635 | A1* | 10/2017 | Kusumoto | G06F 17/13 |
| 2018/0039290 | A1* | 2/2018 | Shafiee | G06Q 50/06 |
| 2018/0196399 | A1* | 7/2018 | Rasekh | G05B 13/042 |
| 2019/0310159 | A1* | 10/2019 | Jarrige | G01M 3/28 |
| 2020/0378561 | A1* | 12/2020 | Kusumoto | E03B 1/00 |
| 2020/0387648 | A1* | 12/2020 | West | E03B 7/02 |
| 2021/0019460 | A1* | 1/2021 | Zheng | G06F 30/28 |
| 2021/0357547 | A1* | 11/2021 | Wright | G06F 30/18 |
| 2022/0064888 | A1* | 3/2022 | Wang | E02B 9/04 |
| 2022/0212130 | A1* | 7/2022 | Parrella | B01D 29/111 |
| 2022/0268251 | A1* | 8/2022 | Degirmenci | F03B 17/00 |

FOREIGN PATENT DOCUMENTS

| | | |
|---|---|---|
| CN | 108399312 A | 8/2018 |
| CN | 109658287 A | 4/2019 |
| CN | 111143954 A | 5/2020 |
| CN | 111611724 A | 9/2020 |

OTHER PUBLICATIONS

Paritosh R. Vasava (Fluid Flow in T-Junction of Pipes, Lappeenranta University of Technology, 2007, pp. 1-61) (Year: 2007).*
James Fay(Flow in Fluid Systems, 1994, pp. 401-439) (Year: 1994).*
International Search Report of PCT/CN2021/081858.
Written Opinion of PCT/CN2021/081858.

* cited by examiner

METHOD FOR CALCULATING HEAD LOSS COEFFICIENT AND BRANCH PIPE FLOW DISTRIBUTION OF MULTI-POINT WATER INTAKE

CROSS-REFERENCE TO RELATED APPLICATIONS

This Application is a national stage application of PCT/CN2021/081858. This application claims priorities from PCT Application No. PCT/CN2021/081858, filed Mar. 19, 2021, and from the Chinese patent application 202010558405.2 filed Jun. 18, 2020, the content of which are incorporated herein in the entirety by reference.

FIELD OF TECHNOLOGY

The present invention relates to a method for calculating a head loss coefficient and branch pipe flow distribution of a multi-point water intake, which is a hydraulic calculation method for pipelines and is a method for rapidly calculating head loss of a water intake and an inflow of each branch pipe when an offshore multi-point intake method is adopted in coastal industries.

BACKGROUND

A series multi-point water intake refers to a water intake facility where an environmental water body flows into a main pipe sequentially through a plurality of water-absorbing branch pipes arranged in series and enters a water using end, and is mainly applied to the situations where a water boundary is far away from the shore or the requirement on water quality is high under the conditions of large water intake, poor nearshore beach quality, gentle coastal slope or low water level. The series multi-point water intake is one of the most commonly used bed offshore water intake types in the coastal industries such as thermal power plants and nuclear power plants. Clarifying the head loss of the water intake is the basis of water intake engineering design. Due to the complex pipeline structure and internal flow state of the multi-point water intake, it is difficult to determine the overall head loss coefficient of the water intake, and there is no direct reference value in actual application. Meanwhile, due to the accumulation of the head loss of the continuous confluence pipeline, the inflow of each branch pipe of the multi-point water intake is uneven. It is very important to clarify the inflow of each branch pipe for the design of the structural strength of the water intake and the inflow velocity, as well as pipeline clogging prevention, gas etching prevention and biological volume loss. At present, there is no clear manual or specification reference to determine the head loss coefficient and flow distribution of the multi-point water intake. In the engineering practice, the scale model test is generally carried out for estimation, which requires long time and high cost, so it is difficult to realize in the preliminary design stage. Therefore, there is an urgent need for an effective method for rapidly calculating a head loss coefficient and flow distribution of a multi-point water intake.

SUMMARY

To overcome the problem in the prior art, the prevent invention provides a method for calculating a head loss coefficient and branch pipe flow distribution of a multi-point water intake. The method utilizes the principle of water conservation in continuous composite pipe flow and the principle that the head loss between any two sections is equal in each flow path and the total mechanical energy loss is minimal and combines a relationship between the head loss of confluence port pipe flow and the flow distribution to put forward an iterative calculation method for a head loss coefficient of a series multi-point water intake and branch pipe flow distribution, so as to provide a basis for guiding the design of the multi-point water intake for coastal industrial water intake.

The objective of the present invention is implemented as follows: a method for calculating a head loss coefficient and branch pipe flow distribution of a multi-point water intake. A multi-point water intake facility calculated by the method includes: a main pipe buried in a water bottom seabed, the main pipe provided with a plurality of confluence ports, branch pipes each vertically connected to a corresponding one of the confluence ports, and a water-absorbing head immersed in water is arranged at a top end of each branch pipe. The method includes the following steps:

step 1: inputting and determining a structure and size information of the multi-point water intake, comprising: cross sectional area A of the main pipe of the multi-point water intake, a shape of each branch pipe, a length $l_i$ of the branch pipe and cross sectional area $A_i$ of the branch pipe, a smooth radius r of a confluence port of the branch pipe and the main pipe, a spacing L between the branch pipes, a flow Reynolds number Re and a rough height of a pipe material, wherein i is a serial number of the branch pipes arranged from upstream to downstream and is equal to 1, 2 ..., n;

step 2: determining a pipeline resistance coefficient: determining a local resistance coefficient $K_{in}$ of the water-absorbing head and an on-way friction resistance coefficient $K_f$ of the main pipe and the branch pipes;

step 3: determining a head loss coefficient form at the confluence port: determining a calculation form of a head loss coefficient $K_{\rightarrow c}$ of a confluence pipe according to shapes of the branch pipes and the main pipe, a flow area ratio, a confluence port angle and the smooth radius and according to a Gardel formula, wherein a loss coefficient of the i-th confluence port comprises a flowing loss coefficient of the branch pipes $K_{i,\ b\rightarrow c}$ of the i-th branch pipe and a penetrating flow loss coefficient $K_{i,\ t\rightarrow c}$ of flowing through the i-th confluence port from the upstream main pipe, the form of the Gardel formula is as follows:

$$K_{t\rightarrow c} = 0.03(1-R_Q)^2 -$$
$$R_Q^2 \left\{ 1 + (1.62 - r^{0.5}) \left[ \frac{\cos(\pi-\theta)}{R_A} - 1 \right] - 0.38(1-R_A) \right\} + (2-R_A)(1-R_Q)R_Q$$

$$K_{b\rightarrow c} = -0.92(1-R_Q)^2 -$$
$$R_Q^2 \left\{ (1.2 - r^{0.5}) \left[ \frac{\cos(\pi-\theta)}{R_A} - 1 \right] + 0.8\left[1 - R_A^{-2}\right] - \left(R_A^{-1} - 1\right)\cos(\pi-\theta) \right\} +$$
$$(2-R_A)(1-R_Q)R_Q$$

wherein $K_{t\rightarrow c}$ is a penetrating flow loss coefficient, $K_{b\rightarrow c}$ is a flowing loss coefficient of the branch pipes, the subscript t represents upstream main pipe flowing, the subscript c represents main pipe downstream, θ is an included angle between the branch pipe and the main pipe upstream, θ=π/2 at the T confluence port, a dimensionless number $R_Q$ is a flow ratio of a branch flow to a downstream main flow, $R_A$ is an area ratio of the branch pipe to the main pipe, and when considering the smooth angle confluence port situation, r is a smooth radius r;

step 4: pre-estimating or adjusting a trial flow: from i=2, pre-estimating a trial dimensionless flow $Q_i'$ of the branch pipe i and an upstream accumulative flow $$\sum_{j=1}^{i-1} Q_j'$$

of the branch pipe i according to experience or existing data, or adjusting a trial flow $Q_i'$ of the branch pipe i and an upstream accumulative flow $$\sum_{j=1}^{i-1} Q_j'$$

of the branch pipe i according to the trial result, wherein i is a value from 2 to n;

step 5: calculating a head loss $K_{\dot{\Phi}}'$ at a downstream confluence port of the branch pipe i: calculating a $K_{\dot{\Phi}}'$ of the confluence port from two flow paths respectively according to the branch pipe flow Qi' and the upstream accumulative flow $$\sum_{j=1}^{i-1} Q_j'$$

obtained by trial calculation:
the first flow path is an upstream penetrating flow path $p_{\Sigma i-1}$;

$$K_{\dot{\Phi}}'\big|_{p_{\Sigma i-1}} = K_{i-1}' + K_{i-1 \sim i,f} \times \left(\sum_{j=1}^{i-1} Q_j'\right)^2 + K_{i,t \to c} \times \left(\sum_{j=1}^{i} Q_j'\right)^2$$

wherein $K_{\dot{\Phi}}'^{|p_{\Sigma i-1}}$ is a trial-calculation head loss of a total confluence flow at the $\dot{\Phi}$ point of the i-th T-shaped confluence port downstream in the main pipe from the first branch pipe $p_1$ to the (i−1)-th branch pipe $p_{i-1}$ from the main pipe upstream penetrating flow to the downstream $\dot{\Phi}$ point, $K_{i-1}'$ is a trial head loss of the position i−1, and $K_{i-1 \sim i,f}$ is an on-way friction resistance loss of the main pipe from the position i−1 to the position i section, the second flow path is a branch pipe flowing flow path $p_i$:

$$K_{\dot{\Phi}}'\big|_{p_i} = K_{i,in} \times \left(\frac{A}{A_i}\right)^2 \times Q_i'^2 + K_{i,f} \times \left(\frac{A}{A_i}\right)^2 \times Q_i'^2 + K_{i,b \to c} \times \left(\sum_{j=1}^{i} Q_j'\right)^2$$

wherein $K_{\dot{\Phi}}'^{|p_i}$ is a trial-calculation head loss at the $\dot{\Phi}$ point of the i-th T-shaped confluence port downstream in the main pipe from the i-th branch pipe to the water flow path $p_i$, $K_{i,in}$ is a local resistance coefficient of the i-th water-absorbing head, and $K_{i,f}$ is an on-way friction resistance coefficient of the i-th branch pipe;

step 6: comparing the head losses calculated by the two flow paths: every time performing one-time adjustment on the branch pipe flow $Q_i'$ and trial calculation on the head loss $K_{\dot{\Phi}}'$ of the branch pipe with a serial number i, that is, comparing the head losses calculated by the two flow paths $p_{\Sigma i-1}$ and $p_i$ for one time, judging whether they are equal, setting a threshold error which is used to judge whether the head losses are equal according to an expected flow precision requirement:

$$|K_{\dot{\Phi}}'^{|p_i} - K_{\dot{\Phi}}'^{|p_{\Sigma i-1}}| < \text{error},$$

if "yes", proceeding to a next branch pipe, and if "no", returning to the step 4 and adjusting the trial-calculation flow, so that the cyclic iterative calculation is performed from i=2 to i=n, that is, the calculation of the most downstream confluence port is completed; and step 7: performing overall calculation: when calculating the most downstream main pipe position $\Omega$, that is, i=n, obtaining a loss coefficient $K_n$ of a composite pipe here, then an overall head loss coefficient K and an overall head loss $\Delta H$ of a water intake system are respectively:

$$K = K_n / \left(\sum Q_i\right)^2$$

$$\Delta H = K \frac{U^2}{2g}$$

wherein in the formula, $$U = \frac{Q}{A}$$

is an average flow velocity of the most downstream main pipe, and g is a gravitational acceleration.

Further, if on-way diameters of the main pipe are different, K may be corrected when the head loss is calculated every time in the above step:

$$K = K_{origin} \left(\frac{A_d}{A_u}\right)^2$$

wherein $A_d$ is area of a downstream main pipe, $A_u$ is area of an upstream main pipe, and $K_{origin}$ is a head loss coefficient of each confluence port meeting a convergence threshold.

The present invention has the following beneficial effects: the flow of each branch pipe is adjusted and the head loss coefficient is repeatedly calculated by utilizing iterative calculation of the head loss coefficients of the flows in two directions, so that the head loss and the flow distribution proportion can be finally and accurately calculated; more accurate head loss and flow distribution proportion can be obtained without specially building a model for simulation; the design expenditure and time are greatly saved; and the method is a very excellent solution.

DETAILED BRIEF DESCRIPTION OF THE DRAWINGS

The present invention is further described with reference to the accompanying drawings and embodiments.

DESCRIPTION OF THE EMBODIMENTS

Embodiment I

Figure 1:
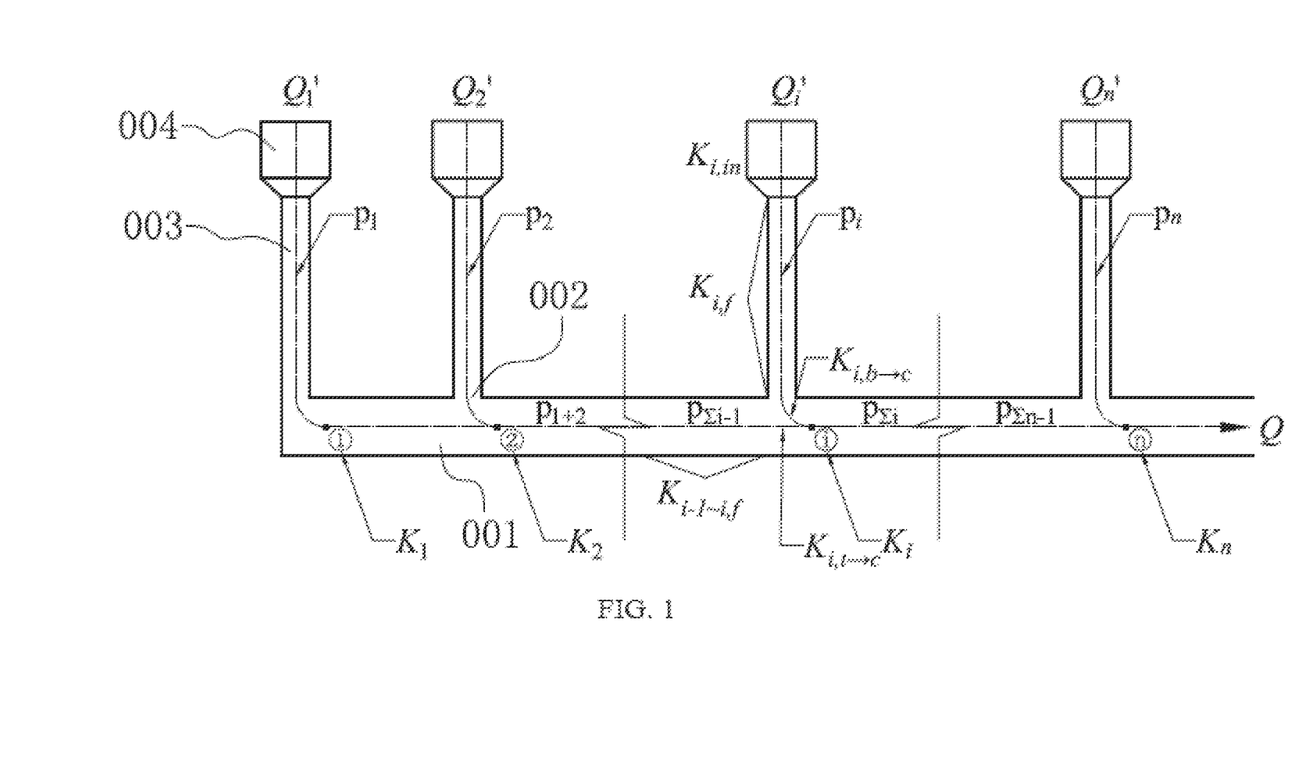
FIG. 1 is a distribution schematic diagram of a structure and serial number of a series multi-point water intake, a flow path and a head loss of the method of the present invention applied in an embodiment I of the present invention.

This embodiment is a method for calculating a head loss coefficient and branch pipe flow distribution of a multi-point water intake. A multi-point water intake facility calculated by the method includes: a main pipe 001 buried in a water bottom seabed, the main pipe is provided with a plurality of confluence ports 002 (generally are T-shaped confluence ports), branch pipes each vertically connected to a corresponding one of the confluence ports 003, and a water-absorbing head 004 immersed in water is arranged at a top end of each branch pipe, as shown in FIG. 1. In FIG. 1, the number of the multi-point water intakes is generalized as four, and the case where the cross sectional area A of the main pipe on way is equal is taken as an example. In practice, there may be more water intakes, such as six and seven. Of course, there may be fewer water intakes, such as two and three. The purpose of setting a plurality of water intakes is to disperse water intake.

Figure 2:
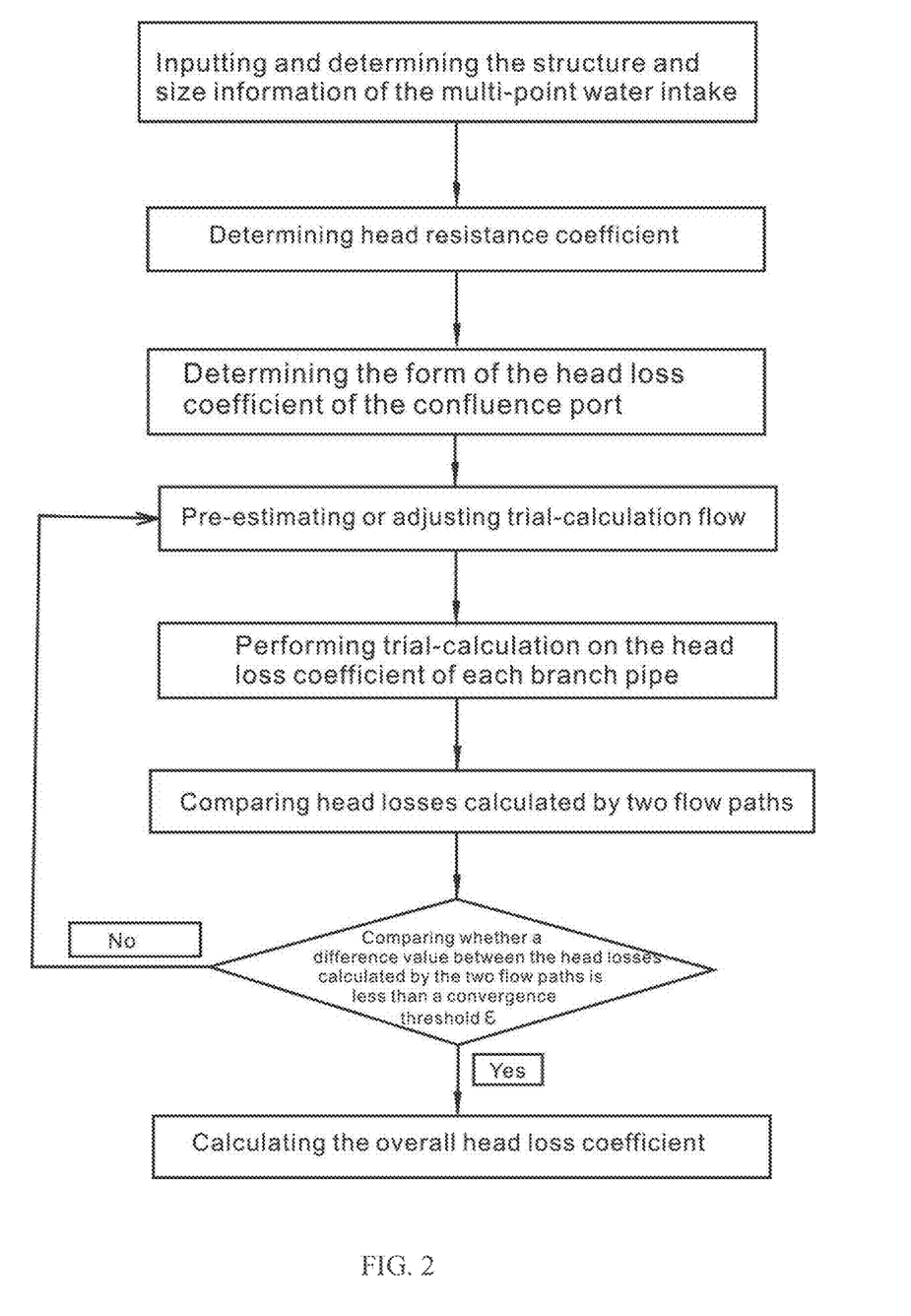
FIG. 2 is a calculation schematic diagram of the method according to an embodiment I of the present invention.

The specific operation process and principle of the method in the embodiment are as follows, and the operation flow is shown in FIG. 2:

firstly, structural information of the multi-point water intake is determined: inputting cross sectional area A of the multi-point water intake, a shape, length $l_i$ and cross sectional area of a branch pipe, a spacing L between the branch pipes, a flow Reynolds number Re and a rough height of a pipe material, wherein the A $A_i$ may be on-way changeable or on-way equal. If the on-way area of the main pipes is not equal, the area $A_d$ of the downstream main pipe and the area $A_u$ of the upstream main pipe of each section are determined, the square of their ratio is calculated, and later the head loss coefficient is standardized, that is, $$K = K'\left(\frac{A_d}{A_u}\right)^2.$$

A local resistance and an on-way resistance coefficient of a single structure are determined: determining a local resistance coefficient $K_{in}$ of the water-absorbing head and an on-way friction resistance coefficient $K_f$ of the main pipe and the branch pipes.

The forms of the head loss coefficients $K_{i,b \to c}$ and $K_{i,t \to c}$ of the T-shaped confluence port are determined according to the cross section area ratio and the shape type of the branch pipes and the main pipe. $K_{i,b \to c}$ and $K_{i,t \to c}$, are generally determined by an area ratio of branch/main pipes, a branch/main flow ratio and a critical distance. In application practice, for the determined multi-point water intake system, parameters such as the area ratio of the branch/main pipe-lines and the distance are determined constants; therefore, values of $K_{i,b \to c}$ and $K_{i,t \to c}$ are only functions of the flow ratio. The loss coefficients of the T-shaped confluence port are $K_{i,b \to c}$ and $K_{i,t \to c}$. Cyclic iterative calculation: assuming the dimensionless inflow $Q_1'$ and $Q_2'$ of the branch pipes, the head loss coefficient $K_{②}'$ of an arrival position ② of a flow path $p_1$ and a flow path $p_2$ is calculated respectively based on this assumption. Generally speaking, $p_1$ calculation includes the following parts:

$K_{②}'|_{p1}$=head loss coefficient $K_{①}'|_{p1}$ at the position ①
+on-way friction resistance loss coefficient $K_{1 \sim 2,f} \times Q_1'^2$ of the section 1-2 of the main pipe
+overflow head coefficient $K_{2,t \to c} \times (Q_1'+Q_2')^2$ of confluence port 2 wherein $K_{①}'|_{p1}$=local resistance coefficient $$K_{1,in} \times \left(\frac{A}{A_1}\right)^2 \times Q_1'^2$$

of water-absorbing head 1
+on-way friction resistance loss coefficient $$K_{1,f} \times \left(\frac{A}{A_1}\right)^2 \times Q_1'^2$$

of the vertical pipe 1
+penetrating flow head loss coefficient $K_{1,t-t} \times Q_1'^2$ of confluence port 1

$p_2$ calculation includes the following parts:
$K_{②}'|_{p2}$=local resistance coefficient $$K_{2,in} \times \left(\frac{A}{A_2}\right)^2 \times Q_2'^2$$

of inlet 2
+on-way friction resistance coefficient $$K_{2,f} \times \left(\frac{A}{A_2}\right)^2 \times Q_2'^2$$

of vertical pipe 2
+branch flow confluence head loss coefficient $K_{2,b \to t} \times (Q_1'+Q_2')^2$ of confluence port 2

Then whether the loss coefficients calculated by the two paths are equal ($K_{②}'^{|p1} = K_{②}'^{|p2}$) is judged, or whether a difference value between the two meets a set convergence threshold ($|K_{②}'^{|p1} - K_{②}'^{|p2}| <$error) is judged, wherein error is the convergence threshold with a value of 0.01 Q. If the loss coefficients are not equal or the difference between the two is greater than the set threshold, flow distribution is adjusted, $K_ɸ'^{|p\Sigma_{i-1}}$ and $K_ɸ'^{|p_i}$ are calculated again until the loss coefficients are equal, and the loss coefficient $K_2'$ at the position ② is calculated. flow distribution may be adjusted by a gradient descent method.

Incremental calculation is continued along the pipeline serial number according to the above calculation process, the head loss coefficient of a ɸ position is calculated by the loss coefficient $K_{i-1}'$ of the i−1 position calculated in the previous step and the assumed flow of the branch pipe i: calculating the head loss coefficient $K_ɸ'^{|p\Sigma_{i-1}}$ of an arrival position ɸ of a flow path $K_ɸ'^{\Sigma p\Sigma_{i-1}}$ (after confluence of the branch pipes 1, 2, ..., i−1), and calculating a loss coefficient $K_{\phi}^{'|p_i}$ of an arrival position $\phi$ of a flow path $p_i$ (entering from the branch pipe i),
wherein
$K_{\phi}^{'|p_{\Sigma i-1}}$=a head loss coefficient $K_{i-1}$ of the position i−1, +on-way friction resistance head loss $$K_{i-1\sim i,f} \times \left(\sum_{j=1}^{i-1} Q'_j\right)^2$$

in the section i−1 to i of the main pipe
+overflow head loss coefficient $$K_{i,t\to c} \times \left(\sum_{j=1}^{i-1} Q'_j\right)^2$$

of confluence port i
$K_{\phi}^{'|p_i}$=local resistance coefficient $$K_{i,in} \times \left(\frac{A}{A_1}\right)^2 \times Q'^2_i$$

of inlet i
+on-way friction $$K_{i,f} \times \left(\frac{A}{A_i}\right)^2 \times Q'^2_i$$

resistance coefficient in vertical pipe i
+branch flow confluence head loss coefficient $$K_{i,b\to c} \times \left(\sum_{j=1}^{i} Q'_i\right)^2$$

of confluence port i
If comparison between $K_{\phi}^{'|p_i}$ and $K_{\phi}^{'|p_{\Sigma i-1}}$ does not meet a set convergence criterion, a flow $Q_i'$ of the pipe i is assumed again until the convergence criterion is met, and the loss coefficient $K_i'$ at the position $\phi$ is obtained.
1) When the most downstream main pipe position n is calculated, that is, i=n, a loss coefficient $K_n$ of a composite pipe here may be obtained.
2) Then an overall head loss coefficient and an overall head loss of a water intake system are respectively:

$$K = K_n / \left(\sum Q_i\right)^2$$

$$\Delta H = K \frac{U^2}{2g}$$

In the formula, $$U = \frac{Q}{A} =$$

is an average flow velocity of the most downstream main pipe.

The multi-point water intakes arranged in series may be regarded as a continuous confluence pipeline. For a continuous confluence pipe with a constant main pipe on-way section, with the gradual confluence of the water flow, the total flow velocity of the main pipe gradually increases, but static pressure gradually decreases. For a short composite pipe, the static pressure decreasing towards the downstream end along the way will increase the flow of the branch pipe at the downstream end. Finally, the confluence quantity of the branch pipe at the near end is large and the confluence quantity of the branch pipe at the tail end is minimal.

The core of solving the flow distribution and the total loss coefficient of the series multi-point water intake is to clarify the form of a constraint function K ( )—the expression form of the local head loss and the on-way loss. A method for determining a head loss coefficient in a constraint formula is as follows:

$K_{in}$ is a local head loss coefficient of the water flow entering from a water-absorbing head to the branch pipe, and the general expression is:

$$K_{i,in} = \xi_i$$

Wherein, $\xi$ is a local resistance coefficient of an inlet of the water-absorbing head. In general, the water-absorbing heads of the multi-point water intakes have the consistent shape and size and have the same local head loss coefficient $\xi$ which may be selected as a constant value by inquiring a local resistance coefficient table (a water inlet with a top cap+ a gradient shrinkage section) according to the structural size form of the water-absorbing heads.

$K_f$ represents an on-way head loss coefficient, and the general expression is:
Branch pipe:

$$K_{i,f} = \lambda_i \frac{l_i}{d_i}$$

Main pipe:

$$K_{i-1\sim i,f} = \lambda \frac{L_{i-1\sim i}}{D}$$

$\lambda_i$ is an on-way friction resistance coefficient of the pipeline, which is related to a Reynolds number Re and relative roughness $\Delta$ of a vertical pipe. It may be calculated by an empirical formula according to the flow state:

$$K_p = \frac{Q_t K_{t\to c} + Q_b K_{b\to c}}{Q_c}$$

In the actual engineering, a spacing $L_{i-1\sim i}$ between the branch pipes is generally about 3-5 D. At this time, the local head loss of the confluence is absolutely dominant compared with the main pipe on-way loss, and an on-way head loss of a main pipe section between the adjacent vertical pipes may be completely covered by $\Delta h_{i,\to c}$. Therefore, the main pipe on-way head loss $\Delta h_{i-1\sim i,f} \approx 0$ is ignored.

$K_{\to c}$ represents a branch flow confluence loss at the confluence port and a main pipe penetrating flow loss coefficient. The local head loss coefficient at the confluence port is closed related to a flow ratio, an area ratio and a smooth radius r, that is, $K_{i \to c}$=function($R_{Ai}$, $R_{Qi}$, r); therefore, the constraint formula function is a non-linear form. In the actual application, $R_{Ai}$ and r have been determined, so f is only a function of $R_{Qi}$.

for the first branch pipe of the multi-point water intake of an upstream seal ($Q_0$=0) a local loss coefficient at the confluence port may be expressed as $K_{1,b \to c}$=function($R_{A1}$, $R_{Q1}$=1,r). However, in most cases, the head loss coefficient of the bending confluence pipeline needs to be necessarily corrected.

Figure 3:
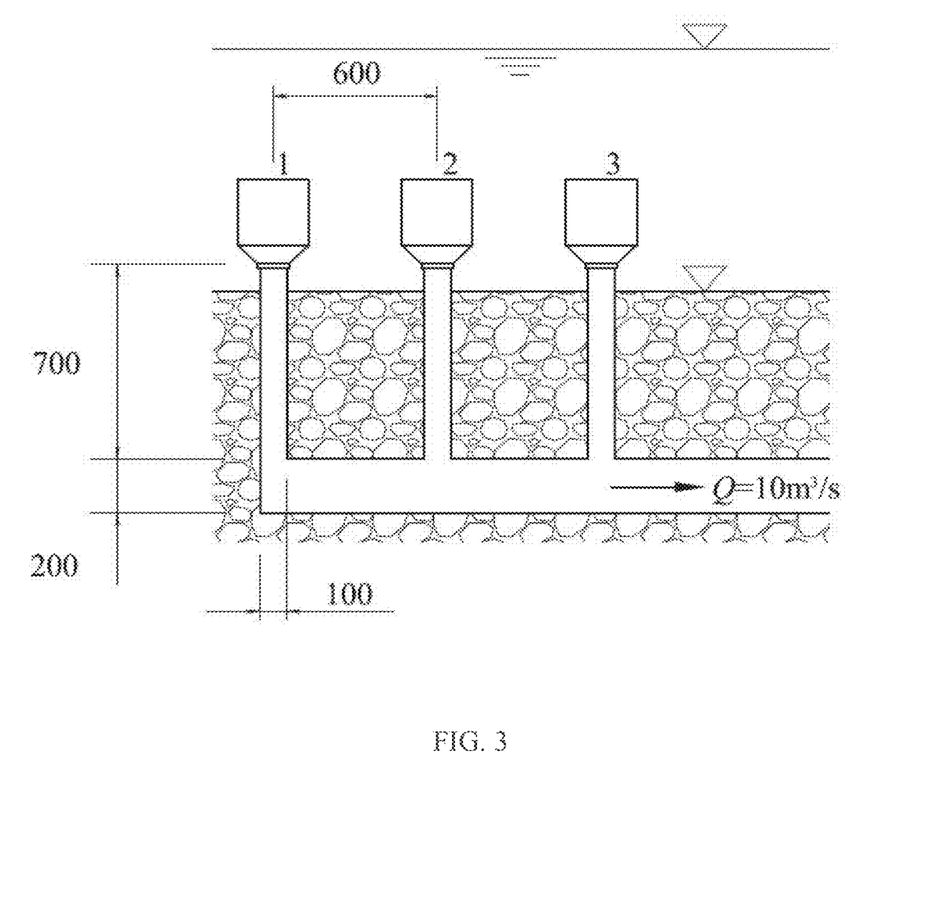
FIG. 3 is a schematic diagram of an application example: a 3-point water intake of a certain power plant, in an embodiment I of the present invention.
Figure 4:
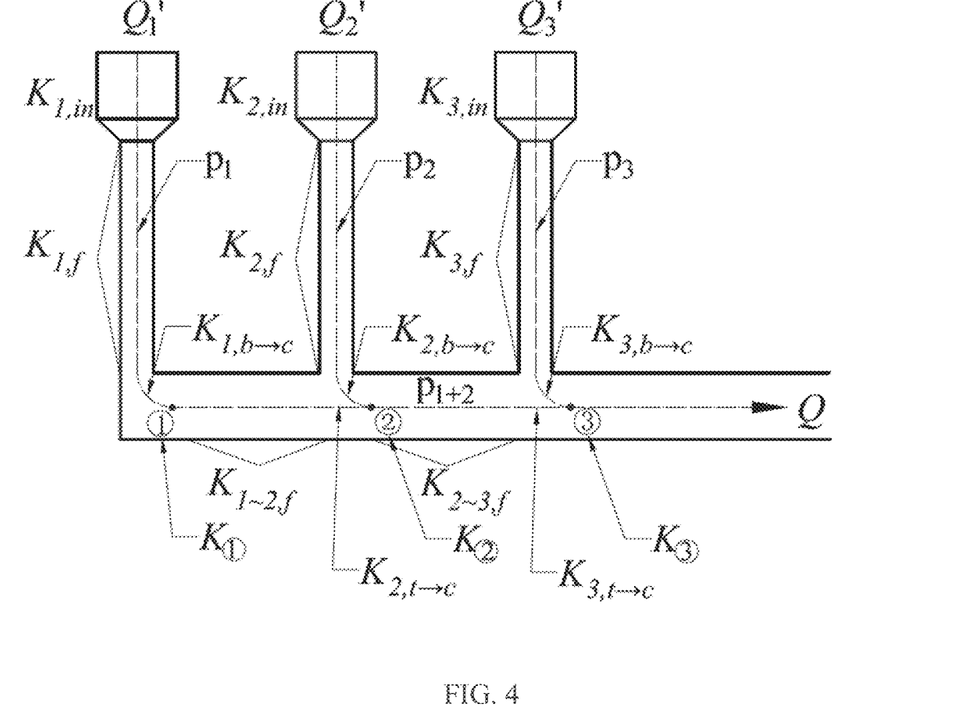
FIG. 4 is a schematic diagram of an application example: a calculation process of three flow paths p and three positions, in an embodiment I of the present invention.

APPLICATION EXAMPLE a certain power plant will adopt a 3-point water intake in the form of a buried culvert under a seabed to take water and cool. The structure of a water intake system is as shown in FIG. 3. FIG. 4 shows the meaning of each operational symbol of the structure of the water intake system, wherein the confluence port ⓑ may be simplified as a special T-shaped confluence port. At the beginning of the design of the water intake, it is necessary to estimate inflow distribution of three branch pipes and the overall head loss coefficient. The local resistance coefficient of the water-absorbing head (water inlet) of the water intake vertical pipe is assumed as 0.25; and the friction resistance coefficient of the pipeline is estimated as 0.015. The multi-point water intake pipeline belongs to a short composite pipe. In most cases, the friction resistance head loss may be ignored. In order to make the calculation example general, this example is considered. It may be seen from FIG. 3 that the branch pipes are equally spaced, the spacing is about 3 times the diameter D of the main pipe, and a length of each branch pipe is 7 times the pipe diameter. According to the existing pipeline confluence and research conclusion, this structure may ignore the neighborhood interference between the branch pipes. A head loss coefficient of a single confluence port may be calculated by using a previous test fitted curve or a Gardel formula. In FIG. 3, the size marking unit is centimeter.

in view of the constant area A of the main pipe in this example, the area $A_i$, the length $l_i$ and the spacing $L_i$ of each branch pipe are equal (i=1,2,3), so $$R_{Ai} = \left(\frac{d}{D}\right)^2 = 0.25$$

$$K_{i,in} = 0.25$$

$$K_{i,f} = f\frac{l_i}{d_i} = 0.015 \times \frac{7}{1} = 0.105$$

$$K_{i-1 \sim i,f} = f\frac{L_{i-1 \sim i}}{D} = 0.015 \times \frac{6}{2} = 0.045$$

The specific calculating process is as follows:

step 1: referring to the flow distribution in FIG. 4, the flow distribution proportions are preliminarily pre-estimated as $Q_1'$=0.28, $Q_2'$=0.32 and $Q_3'$=0.4. According to the Gardel formula of the T-shaped confluence head loss coefficient, the head loss coefficient of the confluence port is a function of a branch/main area ratio and a branch/main flow ratio:

$$K_{1,b \to c} = \text{function}_1\left(\frac{A_1}{A}, \frac{Q_1'}{Q_1'}\right) = \text{function}_1(0.25, 1) \approx 8.0$$

$$K_{2,b \to c} \approx \text{function}_1\left(\frac{A_2}{A}, \frac{Q_2'}{(Q_1'+Q_2')}\right) = \text{function}_1(0.25, 0.53) \approx 2.4$$

According to the Gardel formula of the T-shaped confluence head loss coefficient, the head loss coefficient of the confluence port is also a function of a branch/main area ratio and a branch/main flow ratio:

$$K_{2,t \to c} \approx \text{function}_2\left(\frac{A_2}{A}, \frac{Q_2'}{Q_3'}\right) = \text{function}_2\left(0.25, \frac{0.32}{0.28+0.32}\right) \approx 0.69$$

Step 2: a total loss coefficient $K_{②}'$ (corresponding to the flow velocity at a position ② from a flow path $p_1$ to the position ②:

$K_{②}'|_{p1}$=local resistance coefficient $$K_{1,in} \times \left(\frac{A}{A_1}\right)^2 \times Q_1'^2$$

of inlet 1
+on-way friction resistance coefficient $$K_{1,f} \times \left(\frac{A}{A_1}\right)^2 \times Q_1'^2$$

of vertical pipe 1
+branch flow confluence head loss coefficient $K_{1,b \to c} \times Q_1'^2$ of confluence port 1
+on-way friction resistance coefficient $K_{1-2,f} \times Q_1'^2$ in the section 1-2 of the main pipe
+overflow head loss coefficient $K_{2,t \to c} \times (Q_1'+Q_2')^2$ of confluence port 2

$$= (0.25+0.105) \times \left(\frac{1}{0.25}\right)^2 \times 0.28^2 +$$
$$(8.0+0.045) \times 0.28^2 + 0.69 \times (0.28+0.32)^2 = 1.1$$

Step 3: a total head loss coefficient $K_{②}'$ from a flow path $p_2$ to the position ②:

$K_{②}'|_{p2}$=local resistance coefficient $$K_{2,in} \times \left(\frac{A}{A_2}\right)^2 \times Q_2'^2$$

of inlet 2
+on-way friction resistance coefficient $$K_{2,f} \times \left(\frac{A}{A_2}\right)^2 \times Q_2'^2$$

of vertical pipe 2
+branch flow confluence head loss coefficient $K_{2,b \to c} \times (Q_1'+Q_2')^2$ of confluence port 2

$$= (0.25 + 0.105) \times \left(\frac{1}{0.25}\right)^2 \times 0.32^2 + 2.4 \times (0.28 + 0.32)^2 = 1.16$$

Step 4: a difference value between values of $|K_{②}'|_{p1} - K_{②}'|_{p2}|$ obtained by two calculation methods is compared, $|K_{②}'|_{p1} - K_{②}'|_{p2}| = 0.06$, and there is a certain error.

Flow distribution proportions are re-adjusted as $Q_1' = 0.285$, $Q_2' = 0.315$ and $Q_3' = 0.4$. Then a flow path $p_1$:

$$K_{2,t \to c} \approx \text{function}_2\left(0.25, \frac{0.315}{0.6}\right) = 0.68,$$

so that $K_{②}'|_{p1} = 1.13$ is obtained; and a flow path $p_2$:

$$K_{2,b \to c} \approx \text{function}_1\left(0.25, \frac{0.315}{0.6}\right) = 2.3,$$

so that $K_{②}'|_{p2} = 1.11$ is obtained.

At this time, it is considered that the loss coefficients calculated by the two flow paths are basically equal, so $Q_1 = 0.285$, $Q_2 = 0.315$ and $$K_{②} \approx \frac{1.13 + 1.11}{2} = 1.12$$

are determined.

Step 5: a head loss coefficient of a position ③ is continuously calculated. Firstly, a head loss coefficient from a flow path $p_{1+2}$ to the position ③ is calculated. According to the above calculation, $K_{②} = 1.12$; and $$K_{3,t \to c} \approx \text{function}_2\left(\frac{A_3}{A}, \frac{Q_2'}{Q_3'}\right) = \text{function}_2\left(0.25, \frac{0.4}{1}\right) \approx 0.52$$

is deduced through the pre-estimated $Q_3' = 0.4$ and Gardel formula of the T-shaped confluence head loss coefficient.

Therefore, the total head loss coefficient from the flow path $p_{1+2}$ to the position ③ is:

$K_{③}'|_{p1+2} = K_{②}$
+on-way friction resistance loss coefficient $K_{2-3,f} \times (Q_1' + Q_2')^2$ of the section 2-3 of the main pipe
+overflow head loss coefficient $K_{3,t \to c} \times (Q_1' + Q_2' + Q_3')^2$ of confluence port $3 = 1.12 + 0.045 \times 0.6^2 + 0.52 \times 1.0^2 = 1.66$ Step 6: a total head loss coefficient $K_{③}'$ from a flow path $p_3$ to the position ③ is calculated. According to the Gardel formula:

$$K_{3,b \to c} = \text{function}_1\left(\frac{A_3}{A}, \frac{Q_3'}{(Q_1' + Q_2' + Q_3')}\right) = \text{function}_1(0.25, 0.4) \approx 1.4$$

Therefore, the total head loss coefficient from the flow path $p_3$ to the position ③ is:

$K_{③}'|_{p3}$ = local resistance coefficient $$K_{3,in} \times \left(\frac{A}{A_3}\right)^2 \times Q_3'^2$$

of inlet 3
+on-way friction resistance coefficient $$K_{3,f} \times \left(\frac{A}{A_3}\right)^2 \times Q_3'^2$$

of vertical pipe 3
+branch flow confluence head loss coefficient $K_{3,b \to t} \times (Q_1' + Q_2' + Q_3')^3$ of confluence port 3

$$= (0.25 + 0.105) \times \left(\frac{1}{0.25}\right)^2 \times 0.4^2 + 1.4 \times 1.0^2 = 1.86$$

Step 7: $K_{③}'$ values obtained by the two calculation methods are compared. $|K_{③}'|_{p1} - K_{③}'|_{p2}| = 0.2$, that is, the head loss coefficient calculated by the flow path $p_3$ is too large, so it is re-adjusted as a small flow $Q_3' = 0.38$ (without adjusting $Q_1'$ and $Q_2'$), and the step 5 and the step 6 are repeated. The $K_{③}'$ of the two paths may be calculated to be 1.65 and 1.66 respectively. It may be considered that the two are equal, and accurate $K_{③} = 1.655$ is obtained.

Step 8: a next position ④ is continuously calculated, and the method is as same as the above. In this example, there are only three vertical pipes, that is, the position ③ is the most downstream main pipe position. Then an overall head loss coefficient of a water intake system is:

$$K = \frac{K_{③}}{\left(\sum Q_i\right)^2} = \frac{1.655}{(0.285 + 0.315 + 0.38)^2} = 1.78$$

Step 9: the above calculation has obtained the total head loss coefficient of the water intake system and the flow distribution proportion of each branch pipe. According to the design input data, the total head loss and the absolute flow of the branch pipe may be calculated:

$$U = \frac{Q}{A} = \frac{10}{2.0^2 \pi / 4} = 3.18 \text{ m/s}$$

$$\Delta H = K \frac{U^2}{2g} = 1.73 \times \frac{9.55^2}{2 \times 9.81} = 0.894 \text{ m}$$

$$Q_1 = 30 \times \frac{0.285}{(0.285 + 0.315 + 0.38)} = 8.72 \text{ m}^3/\text{s}$$

$$Q_2 = 30 \times \frac{0.315}{(0.285 + 0.315 + 0.38)} = 9.64 \text{ m}^3/\text{s}$$

$$Q_3 = 30 \times \frac{0.38}{(0.285 + 0.315 + 0.38)} = 11.63 \text{ m}^3/\text{s}$$

At this point, a flow velocity U of the most downstream main pipe, the overall head loss $\Delta H$ and flows of the three branch pipes $Q_1$, $Q_2$ and $Q_3$ are calculated, and the calculation process ends.

Simulation Experiment

Figure 5:
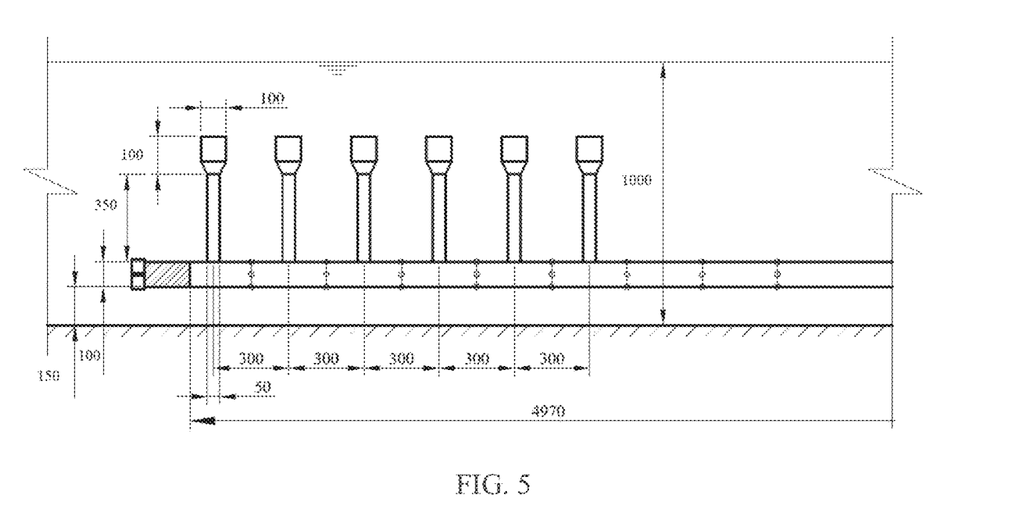
FIG. 5 is a structural schematic diagram of a model size of a 6-point position model test in an embodiment I of the present invention.

According to this embodiment, the flow distribution and the head loss coefficient of the method are calculated by an experimental model of a round branch pipe 6-point water intake shown in FIG. 5 so as to verify the correctness of the method according to this embodiment. In FIG. 5, the marking size unit is centimeter.

(1) 6 round water-absorbing vertical pipes are arranged at the top of the main pipe at equal intervals, the upper end of each of the water-absorbing vertical pipes is an immersed mushroom head type water-absorbing head, environmental water flows into the water-absorbing head from the side, enters the vertical pipe and then sequentially flows into the main pipe, and the specific size of the model is shown in FIG. 5.

(2) A head loss coefficient of the water-absorbing head inlet: since the six water-absorbing heads have the consistent shape and size, the local head loss coefficients are the same. According to the test measurement, the local resistance coefficient $\xi_i$ of the used water-absorbing head $\approx 0.574$ (lateral water inlet 0.5+round reducing pipe 0.074).

$$K_{i,in} = \xi_{i=0.574}$$

(3) An on-way friction resistance loss coefficient of the vertical pipe: the on-way friction resistance loss coefficient $\lambda$ is calculated by using a Colobrook-White formula and according to $\Delta_i$ and $Re_i$, an absolute roughness $\varepsilon$ of a model pipe is 2.0 μm, and the relative roughness height of the branch pipe $$\Delta_i = \frac{\varepsilon}{d} = 2 \times 10^{-5}.$$

A transition section with a 1d length at the downstream of a gradually changed section of the water-absorbing head is ignored when the on-way loss is calculated, that is, an effective friction resistance distance is li=l–d=0.3 m.

$$K_{i,f} = \lambda_i(\Delta_i, Re_i)\frac{l_i}{d} = \lambda_i(2 \times 10^{-5}, \frac{4Q_i}{v\pi d})\frac{l_i}{d}$$

A spacing L between the branch pipes is equal to 3D, so the on-way loss $\Delta h_{i-1-i,f} \approx 0$ of the main pipe is ignored.

(4) A confluence port loss coefficient: the spacing among six continuous confluence ports are equal and are six times the diameter of the branch pipe. According to the previous research, most local water losses caused by confluence occur within this spacing, that is, the mutual influence of the confluence ports is small.

A confluence energy loss coefficient $K_{\rightarrow c}$-$R_Q$ adopts a formula of an optimized quadratic function type:

$$K_{t \rightarrow c}(R_Q)|_{R_A=0.25, radii=0} = 0.233 R_Q^2 + 1.598 R_Q$$

$$K_{b \rightarrow c}(R_Q)|_{R_A=0.25, radii=0} = -1.06 R_Q^2 + 5.421 R_Q - 1$$

(5) In this test, the upstream of the confluence port 1 is closed (that is, $Q_0=0$), and there is a section of convex stagnant water area (part of construction space is generally remained at the end of a pipe shield in engineering practice). The local loss coefficient of the confluence port is similar to the confluence of $R_Q=1$, but due to the influence of the reverse reflux in the stagnant water area, the local head loss coefficient needs to be calculated specially.

(6)

$$K_{1,in} =$$

$$\xi_1 \approx 0.574, \left(\frac{A}{A_1}\right)^2 = 16 \text{ and } K_{1,f} = \lambda_1(\Delta_1, Re_1)\frac{l}{d} = 0.0178\frac{l}{d} = 0.1065$$

are substituted into an equation to obtain $K_{1,b \rightarrow c}=5.542$.

(7) A relationship among the number of the branch pipes, the flow distribution and the total loss coefficient is calculated:

According to an iterative calculation method provided by this embodiment, the flow distribution and the overall head loss coefficient of the multi-point water intake of different numbers of branch pipes may be solved. The iteration steps are completed by computer programming optimization iteration.

When Q=25.11 L/s, the flow and the head loss coefficient of the n=1-6 branch pipes are calculated according to the measured $K_1=16.43$. It may be seen from Table 1 and Table 2 that by the method according to the embodiment, the head loss distribution and flow distribution of different numbers of pipelines may be calculated accurately.

TABLE 1

Comparison between the flow distribution of each branch pipe and the head loss coefficient of the downstream of the confluence port, and the test result

| Type | Branch pipe | Branch pipe 1# | Branch pipe 2# | Branch pipe 3# | Branch pipe 4# | Branch pipe 5# | Branch pipe 6# |
|---|---|---|---|---|---|---|---|
| Actually measured in the experiment | K | 16.01/16.43 | 3.51 | 2.30 | 1.56 | 1.21 | 1.01 |
| | Flow distribution proportion | 10.6% | 11.9% | 14.0% | 16.4% | 20.7% | 26.4% |
| Calculated by this method | $K_n$ | 16.43 | 4.64 | 2.43 | 1.60 | 1.16 | 0.87 |
| | Flow distribution proportion | 11.4% | 12.7% | 14.4% | 17.1% | 20.3% | 24.1% |

Embodiment II

This embodiment is an improvement of the embodiment I and a refinement of the main pipe in the embodiment I. In this embodiment, the on-way diameters of the main pipes are equal, but when the on-way diameters of the main pipes change, the loss coefficient K may be corrected:

$$K_{correct} = K_{origin}\left(\frac{A_d}{A_u}\right)^2$$

wherein $A_d$ is area of a downstream main pipe, $A_u$ is area of an upstream main pipe, $K_{origin}$ is an uncorrected head loss, and $K_{correct}$ is a corrected head loss.

Finally, it should be noted that the above is only used to describe the technical solution of the present invention, but not to limit it. Although the present invention is described in detail with reference to the form of the 3-point water intake, the mushroom head type water-absorbing head and the Gardel formula of the confluence flow head loss coefficient, those of ordinary skill in the art should understand that the technical solutions (such as different forms of water-absorbing heads, different numbers of water-absorbing vertical pipes and different confluence flow head loss coefficient formulas) of the present invention may be corrected or equivalently replaced without departing from the spirit and scope of the technical solutions of the present invention.

The invention claimed is:

1. A method for calculating a head loss coefficient and branch pipe flow distribution of a multi-point water intake, for designing a structure of a multi-point water intake facility which comprises a main pipe, provided with a plurality of confluence ports, buried in a water bottom seabed, branch pipes each vertically connected to a corresponding one of the confluence ports, and water-absorbing heads each immersed in water and arranged at a top end of each branch pipe, the method comprising the following steps:

step 1: inputting and determining a structure and size information of the main pipe, the plurality of confluence ports and the branch pipes, wherein, the structure and size information comprise cross sectional area A of the main pipe of the multi-point water intake, a shape of each branch pipe, a length $l_i$ of the branch pipes and cross sectional area $A_i$ of the branch pipes, a smooth radius r of a confluence port of the branch pipe and the main pipe, a spacing L between the branch pipes, a flow Reynolds number Re and a rough height of a pipe material, wherein i is a serial number of the branch pipes arranged from upstream to downstream and is equal to 1, 2 . . . , n;

step 2: determining local pipeline resistance coefficients of the water-absorbing heads and on-way friction resistance coefficients of the main pipe and the branch pipes, wherein, determining a local resistance coefficient $K_{in}$ of the water-absorbing head and an on-way friction resistance coefficient $K_f$ of the main pipe and the branch pipes;

step 3: determining a head loss coefficient at the confluence port according to the structure and size information and the local pipeline resistance coefficients of the water-absorbing heads and on-way friction resistance coefficients of the main pipe and the branch pipes, wherein, determining a calculation form of a head loss coefficient $K_{\rightarrow c}$ of a confluence pipe according to shapes of the branch pipes and the main pipe, a flow area ratio, a confluence port angle and the smooth radius and according to a Gardel formula, wherein a loss coefficient of an i-th confluence port comprises a flowing loss coefficient of the branch pipes $K_{i,\,b\rightarrow c}$ of an i-th branch pipe and a penetrating flow loss coefficient $K_{i,\,t\rightarrow c}$ of flowing through the i-th confluence port from the upstream main pipe, the form of the Gardel formula is as follows:

$$K_{t\rightarrow c} = 0.03(1-R_Q)^2 -$$
$$R_Q^2\left\{1 + (1.62 - r^{0.5})\left[\frac{\cos(\pi-\theta)}{R_A} - 1\right] - 0.38(1-R_A)\right\} + (2-R_A)(1-R_Q)R_Q$$

$$K_{b\rightarrow c} = -0.92(1-R_Q)^2 -$$
$$R_Q^2\left\{(1.2 - r^{0.5})\left[\frac{\cos(\pi-\theta)}{R_A} - 1\right] + 0.8\left[1 - R_A^{-2}\right] - \left(R_A^{-1} - 1\right)\cos(\pi-\theta)\right\} +$$
$$(2-R_A)(1-R_Q)R_Q$$

wherein $K_{t\rightarrow c}$ is a penetrating flow loss coefficient of the main pipe, $K_{b\rightarrow c}$ is a flowing loss coefficient of the branch pipes, the subscript t represents upstream main pipe flowing, the subscript c represents main pipe downstream, θ is an included angle between the branch pipe and the main pipe upstream, θ=π/2 at the T confluence port, a dimensionless number $R_Q$ is a flow ratio of a branch flow to a downstream main flow, $R_A$ is an area ratio of the branch pipe to the main pipe, and r is a smooth radius r of a confluence port of the branch pipe and the main pipe when considering a smooth angle confluence port situation;

step 4: pre-estimating or adjusting trial flows and upstream accumulative flows of the branch pipes, wherein, from i=2, pre-estimating a trial dimensionless flow $Q_1'$ of the branch pipe i and an upstream accumulative flow $$\sum_{j=1}^{i-1} Q_j'$$

of the branch pipe i according to experience or existing data, or adjusting a trial flow $Q_i'$ of the branch pipe i and an upstream accumulative flow $$\sum_{j=1}^{i-1} Q_j'$$

of the branch pipe i according to the trial result, wherein i is a value from 2 to n;

step 5: calculating a head loss $K_i'$ at a downstream confluence port of the branch pipe i according to the head loss coefficient at the confluence port, and the trial flows and upstream accumulative flows of the branch pipes, wherein, calculating a $K_i'$ of the confluence port from two flow paths respectively according to the branch pipe flow $Q_i'$ and the upstream accumulative flow $$\sum_{j=1}^{i-1} Q_j'$$

obtained by trial calculation:

a first flow path is an upstream penetrating flow path $p_{\Sigma i-1}$:

$$K_1'|_{p_{\Sigma i-1}} = K_{i-1}' + K_{i-1 \sim i,f} \times \left(\sum_{j=1}^{i-1} Q_j'\right)^2 + K_{i,t\rightarrow c} \times \left(\sum_{j=1}^{i} Q_j'\right)^2$$

wherein $K_i'|^{p_{\Sigma i-1}}$ is a trial-calculation head loss of a total confluence flow at the i point of the i-th T-shaped confluence port downstream in the main pipe from the first branch pipe $p_1$ to the (i−1)-th branch pipe $p_{i-1}$ from the main pipe upstream penetrating flow to the downstream i point, $K_{i-1}'$ is a trial head loss of the position i−1, and $K_{i-1 \sim i, f}$ is an on-way friction resistance loss of the main pipe from the position i−1 to the position i section, a second flow path is a branch pipe flowing flow path $p_i$:

$$K_i'|_{p_i} = K_{i,in} \times \left(\frac{A}{A_i}\right)^2 \times Q_i'^2 + K_{i,f} \times \left(\frac{A}{A_i}\right)^2 \times Q_i'^2 + K_{i,b \to c} \times \left(\sum_{j=1}^{i} Q_j'\right)^2$$

wherein $K_i'|^{p_i}$ is a trial-calculation head loss at the i point of the i-th T-shaped confluence port downstream in the main pipe from the i-th branch pipe to the water flow path $p_i$;

step 6: comparing the head losses calculated for the first flow path and the second flow path, judging whether the head losses are equal, if "yes", proceeding to a next branch pipe, and if "no", returning to the step 4 and adjusting the trial-calculation flow, so as to obtain the head losses and flow distribution proportions of the branch pipes, wherein, every time performing one-time adjustment on the branch pipe flow $Q_i'$ and trial calculation on the head loss $K_i'$ of the branch pipe with a serial number i, that is, comparing the head losses calculated by the two flow paths $p_{\Sigma i-1}$ and $p_i$ for one time, judging whether they are equal, setting a threshold error which is used to judge whether the head losses are equal according to an expected flow precision requirement:

$|K_i'|^{p_i} - K_i'|^{p_{\Sigma i-1}}| < $ error, if "yes", proceeding to a next branch pipe, and if "no", returning to the step 4 and adjusting the trial-calculation flow, so that the cyclic iterative calculation is performed from i=2 to i=n, that is, the calculation of the most downstream confluence port is completed; and step 7: calculating an total head loss coefficient of the multi-point water intake facility according to the head losses and flow distribution proportions of the branch pipes, so as to obtain a total head loss of the multi-point water intake facility for designing the structure of the multi-point water intake facility, when calculating the most downstream main pipe position n, that is, i=n, obtaining a loss coefficient $K_n$ of a composite pipe here, then an overall head loss coefficient K and an overall head loss ΔH of a water intake system are respectively:

$$K = K_n / \left(\sum Q_i\right)^2$$

$$\Delta H = K \frac{U^2}{2g}$$

wherein in the formula, $$U = \frac{Q}{A}$$

is an average flow velocity of the most downstream main pipe, and g is a gravitational acceleration.

2. The method according to claim 1, wherein when on-way diameters of the main pipe are different, the head loss K in the above steps is corrected:

$$K_{correct} = K_{origin} \left(\frac{A_d}{A_u}\right)^2$$

$A_d$ being area of a downstream main pipe, $A_u$ being area of an upstream main pipe, $K_{origin}$ being an uncorrected head loss, and $K_{correct}$ being a corrected head loss.

* * * * *